(12) United States Patent
Lubling et al.

(10) Patent No.: US 8,756,151 B1
(45) Date of Patent: Jun. 17, 2014

(54) METHODS OF FACILITATING COLLATERALIZED TRANSACTIONS AND DEVICES THEREOF

(75) Inventors: Amit Lubling, Tenafly, NJ (US); Zachary Cleary, Edgewater, NJ (US)

(73) Assignee: Rembee Inc., New York, NY (US)

( * ) Notice: Subject to any disclaimer, the term of this patent is extended or adjusted under 35 U.S.C. 154(b) by 0 days.

(21) Appl. No.: 13/210,725

(22) Filed: Aug. 16, 2011

Related U.S. Application Data

(60) Provisional application No. 61/374,608, filed on Aug. 17, 2010.

(51) Int. Cl.
*G06Q 40/00* (2012.01)

(52) U.S. Cl.
USPC .......................................................... 705/38

(58) Field of Classification Search
CPC .................................................. G06Q 40/025
USPC .......................................................... 705/38
See application file for complete search history.

(56) References Cited

U.S. PATENT DOCUMENTS

| | | | |
|---|---|---|---|
| 8,032,436 B2 * | 10/2011 | Dailey et al. ..................... | 705/35 |
| 8,095,396 B1 * | 1/2012 | Zublin et al. ...................... | 705/4 |
| 2009/0287543 A1 * | 11/2009 | Allderdice et al. ............. | 705/10 |
| 2011/0137789 A1 * | 6/2011 | Kortina et al. .................. | 705/38 |
| 2012/0023037 A1 * | 1/2012 | Allderdice et al. ......... | 705/36 R |

OTHER PUBLICATIONS

Bronleewe, D.A., "Bitcoin NFC" (source: http://david.bronleewe.net/bitcoin-nfc/bitcoin-nfc.pdf) Aug. 2011.
Rosenfeld, M., "Analysis of Bitcoin Pooled Mining Reward Systems," (source: http://bitcoil.co.il/pool_analysis.pdf) Nov. 17, 2011.
Reid et al., "An Analysis of Anonymity in the Bitcoin System," Jul. 22, 2011.
Grinberg, R., "Bitcoin: An Innovative Alternative Digital Currency," Nov. 11, 2011.
Nakamoto, S., "Bitcoin: A Peer-to-Peer Electronic Cash System," (source: http://www.bitcoin.org/bitcoin.pdf) retrieved on Mar. 8, 2012.
"About Bitcoin," website document retrieved from http://bitcom.org/about.html on Mar. 8, 2012.
"Understanding Klout," website document retrieved from http://klout.com/understand/score on Mar. 8, 2012.
"Understanding Klout," website document retrieved from http://klout.com/understand/klout on Mar. 8, 2012.
"SendLove—The Cool New Employee Recognition System," website document retrieved from http://sendlove.us/trial/ on Mar. 8, 2012.
"The Whuffie Manifesto," website document retrieved from http://thewhuffiebank.org/static/manifesto on Mar. 8, 2012.
"What is Lenddo?," website document retrieved from https://www.lenddo.com/en_US/pages/what_is_lenddo on Mar. 8, 2012.

* cited by examiner

*Primary Examiner* — Lindsay M. Maguire
(74) *Attorney, Agent, or Firm* — LeClairRyan, a Professional Corporation

(57) ABSTRACT

A method, non-transitory computer readable medium, and apparatus that facilitates collateralized transactions including allocating, at a transaction computing apparatus, units of reputation to one or more reputation lenders based on one or more personal attributes of the one or more reputation lenders, obtaining, at the transaction computing apparatus, a transaction request including one or more transaction parameters, associating, with the transaction computing apparatus, collateral with the transaction request wherein the collateral at least includes units of reputation provided by at least one reputation lender, and distributing, with the transaction computing apparatus, units of reputation based on the outcome of the transaction.

15 Claims, 4 Drawing Sheets

| Amortization Table for $2000.00 Borrowed for 12 Months at 15% Interest (10% for Money Lender, 5% for RC Lender) with Exchange Rate for Both Borrower and Reputation Lender of 1RC = $1 and 1000 RC from Each of Borrower and Reputation Lender Contributed as Collateral ||||
|---|---|---|---|
| Month | 1 | | 12 |
| Total Borrower Payment | $180.52 | | $180.52 |
| Principal Paid to Money Lender | $155.52 | | $178.29 |
| Total Interest Paid | $25.00 | | $166.20 |
| Interest Paid | $25.00 | | $2.23 |
| Share of Interest to Money Lender | $16.67 | | $1.49 |
| Share of Interest to RC Lender | $8.33 | ... | $0.74 |
| Balance | $1844.48 | | $0 |
| Bonus RC Paid to Borrower | - | | 166.2 |
| Bonus RC Paid to RC Lender | - | | 166.2 |

FIG. 4

METHODS OF FACILITATING COLLATERALIZED TRANSACTIONS AND DEVICES THEREOF

CROSS-REFERENCE TO RELATED APPLICATIONS

This application claims the benefit of U.S. Provisional Patent Application No. 61/374,608, filed on Aug. 17, 2010 in the name of inventors Amit Lubling, Zachary Cleary, and Chris Dellarocas and entitled "Assessing, Managing, and Distributing Credit Risk Using a Social Guarantor," which is fully incorporated herein by reference.

FIELD

This technology generally relates to methods and devices for facilitating collateralized transactions in accordance with aspects of the present disclosure.

BACKGROUND

In order to assess and manage credit risk, lenders generally rely on credit scores provided by third parties such as the FICO™ credit score provided by Fair Isaac Corporation® of Minneapolis, Minn. Such scores are generally ineffective as they are determined based on a predictive methodology which utilizes historical data. For example, borrowers with little credit history may not be assessed accurately based on quantitative, algorithmic, and/or predictive methodologies utilized by such consumer or credit reporting agencies. This is due to a lack of transaction history of the borrower and the extended time period required for a credit score to update in response to a change in the borrower's financial circumstances. Further, it may be possible for borrowers to inflate their credit scores using techniques that manipulate the parameters considered in the credit score calculation.

Ratings agencies in the corporate, organizational, and public entity contexts also assess risk and provide related services through quantitative models that predict the likelihood of default, volatility and risk. Such predictive methodologies are similarly deficient and unable to accurately assess credit risk.

In order to mitigate the inherent risk in any lending transaction, a collateral arrangement allows a bank, investor, and/or lender, to take temporary or escrowed possession of the borrower's asset (e.g. cash or equity). This provides a means of security in the event a borrower defaults, in which case the lender may take possession of the collateral. However, in such collateralized transactions, the collateral may be depreciating disproportionately and may not at all times be adequately valued with respect to the outstanding loan. Accordingly, collateralizing transactions with physical assets is susceptible to volatile market conditions, which inherently increases lender risk.

In addition to collateral arrangements, many transactions are guaranteed by at least one third party guarantor willing to assume liability on behalf of a borrower in the event the borrower defaults. Unfortunately, analysis of the credit risk of each guarantor is generally also limited to the guarantor's credit score and any of the guarantor's assets. While multiple guarantors generally reduce the overall risk to a lender, assessment and management of risk in such transactions still suffer from the deficiencies identified above. Moreover, a third party guarantor's ability to accurately assess and manage the borrower's credit risk may be limited due to a lack of information, social or other personal relationships, and/or direct knowledge of the borrower's financial circumstances.

Additionally, the inability to qualitatively assess credit risk, and/or use of flawed quantitative assessment data, can result in increased risk to the guarantor.

What is needed is a system and method for collateralizing transactions by managing, mitigating, and distributing risk based on quantitative assessment of social, trust, and/or reputation-based guarantees by third parties.

SUMMARY

In an aspect, a method of facilitating collateralized transactions is disclosed. The method includes allocating, at a transaction computing apparatus, one or more units of reputation to one or more reputation lenders based on one or more personal attributes of the one or more reputation lenders, obtaining, at the transaction computing apparatus, a transaction request including one or more transaction parameters, associating, with the transaction computing apparatus, collateral with the transaction request wherein the collateral at least includes units of reputation provided by at least one reputation lender, and distributing, with the transaction computing apparatus, units of reputation based on the outcome of the transaction.

In an aspect, a non-transitory computer readable medium having stored thereon instructions for facilitating collateralized transactions including allocating, at a transaction computing apparatus, one or more units of reputation to one or more reputation lenders based on one or more personal attributes of the one or more reputation lenders, obtaining, at the transaction computing apparatus, a transaction request including one or more transaction parameters, associating, with the transaction computing apparatus, collateral with the transaction request wherein the collateral at least includes units of reputation provided by at least one reputation lender, and distributing, with the transaction computing apparatus, units of reputation based on the outcome of the transaction.

In an aspect, a transaction computing apparatus includes one or more processors, a memory coupled to the one or more processors which are configured to execute programmed instructions stored in the memory including allocating, at a transaction computing apparatus, one or more units of reputation to one or more reputation lenders based on one or more personal attributes of the one or more reputation lenders, obtaining, at the transaction computing apparatus, a transaction request including one or more transaction parameters, associating, with the transaction computing apparatus, collateral with the transaction request wherein the collateral at least includes units of reputation provided by at least one reputation lender, and distributing, with the transaction computing apparatus, units of reputation based on the outcome of the transaction.

BRIEF DESCRIPTION OF THE DRAWINGS

FIG. 4 illustrates a table showing an exemplary amortization table for an exemplary transaction facilitated by a transaction computing apparatus in accordance with an aspect of the present disclosure.

DETAILED DESCRIPTION

The present disclosure provides an effective and reliable system of assessing, managing, and distributing risk in transactions using reputation as a form of collateral. Units of reputation (also referred to herein as "reputation unit(s)") correspond to a cash value based on an exchange rate determined by the present apparatus 12 for each transaction participant. The exchange rate is determined based on a plurality of parameters including, but not limited to, the borrower's personal attributes, private information, success of internal interactions and transactions, as well as both predictive and non-predictive metrics.

Reputation unit(s) can be borrowed, loaned, purchased, forfeited, and/or redeemed as well as distributed based on the borrower's support of, or involvement in, successful transactions. One such example may involve a borrower loaning reputation as collateral for a new cash loan.

The determined exchange rate and associated reputation unit(s) allows for a system of social guaranteeing and distribution of risk. In particular to an example aspect, reputation lenders can risk units of reputation and receive a return on investment, such as a share of the interest rate on the loan, additional units of reputation, as well as other returns. Accordingly, the system manages and distributes risk by allowing third parties to secure loans using reputation unit(s) that is representative of the borrower's trust, reputation, creditworthiness as well as personal knowledge of the borrower's trustworthiness, reputation and creditworthiness.

Figure 1:
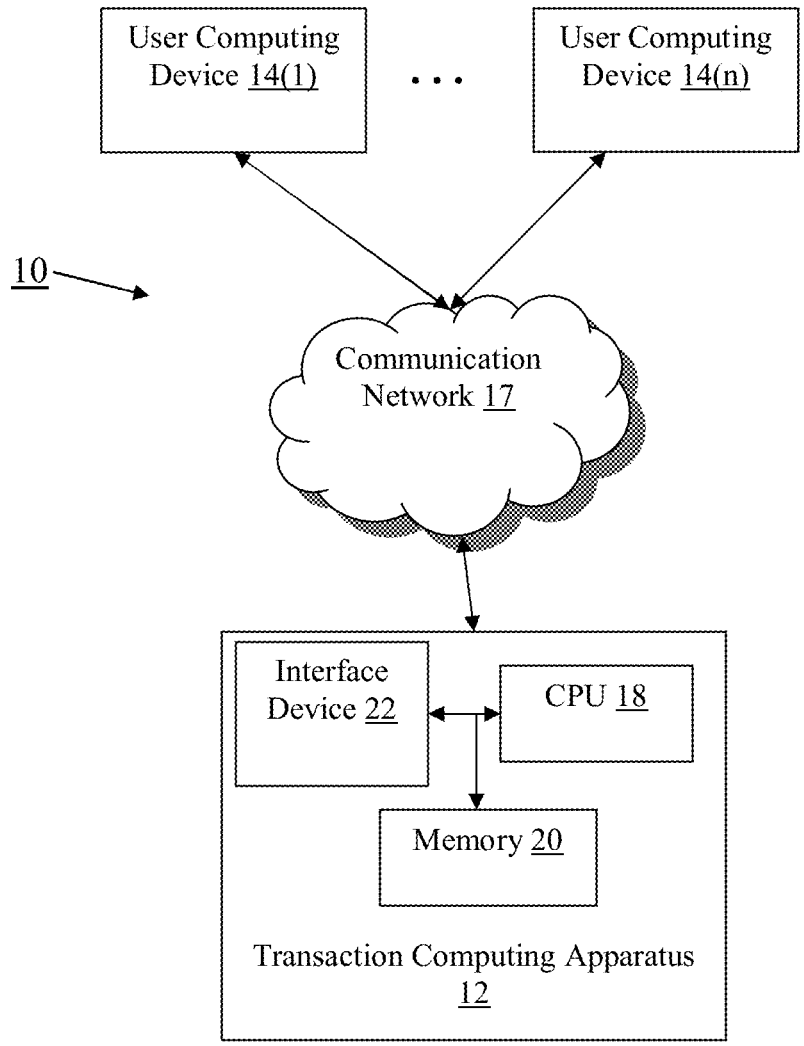
FIG. 1 illustrates an environment including a transaction computing apparatus in accordance with an aspect of the present disclosure.

An environment 10 with an exemplary system including a transaction computing apparatus 12 is illustrated in FIG. 1. The environment 10 includes the transaction computing apparatus 12 and one or more user computing devices 14(1)-14(n), which are all coupled together by one or more communication networks 17, although this environment can include other numbers and types of systems, devices, components, and elements in other configurations, such as multiple numbers of each of these apparatuses and devices.

The transaction computing apparatus 12 is configured to assess, manage, mitigate, and/or distribute risk in collateralized transactions by allocating units of reputation associated with a qualitative measure of reputation, trust, and/or creditworthiness of an individual, user, and/or system participant.

The transaction computing apparatus 12 may be implemented in a computing device, such as a physical server, a virtual server, a client device (e.g. laptop, desktop) and/or a mobile client device (e.g. smartphone, tablet). The computing device includes one or more central processing units (CPUs) or processors 18, memory 20, and interface devices 22 which are coupled together by a bus or other link. It should be noted that other numbers and types of systems, devices, components, and elements in other configurations and locations can be used.

The processor 18 in the transaction computing apparatus 12 executes a program of stored instructions for one or more aspects of the present technology as described and illustrated by way of the examples herein.

The memory 20 in the transaction computing apparatus 12 stores non-transitory computer programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium, which is read from and written to by a magnetic, optical, or other reading and writing system that is coupled to the processor 18, can be used.

The interface device 22 in the transaction computing apparatus 12 is used to operatively couple and communicate between the transaction computing apparatus 12 and the user computing devices 14(1)-14(n) via one or more communications networks 17, although other types and numbers of communication networks or systems with other types and numbers of connections and configurations can be used. By way of example only, the communications network 17 can use TCP/IP over Ethernet and industry-standard protocols, including NFS, CIFS, SOAP, XML, LDAP, and SNMP. Other types and numbers of communication networks, such as a direct connection, a local area network, a wide area network, modems and phone lines, e-mail, and wireless communication technology, each having their own communications protocols, can be used.

Although the transaction computing apparatus 12 and the borrower computing devices 14(1)-14(n) are shown coupled together via the communication network 17, each of these systems can be implemented on any suitable computer system or computing device such as a client device and/or a physical/virtual server. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer device or devices that extend across any suitable network using any suitable interface mechanisms and communications technologies. Such mechanisms include, but are not limited to, telecommunications in any suitable form (e.g., voice and modem), wireless communications media, wireless communications networks, cellular communications networks, G3 communications networks, Public Switched Telephone Networks (PSTNs), Packet Data Networks (PDNs), the Internet, intranets, and combinations thereof.

Figure 2:
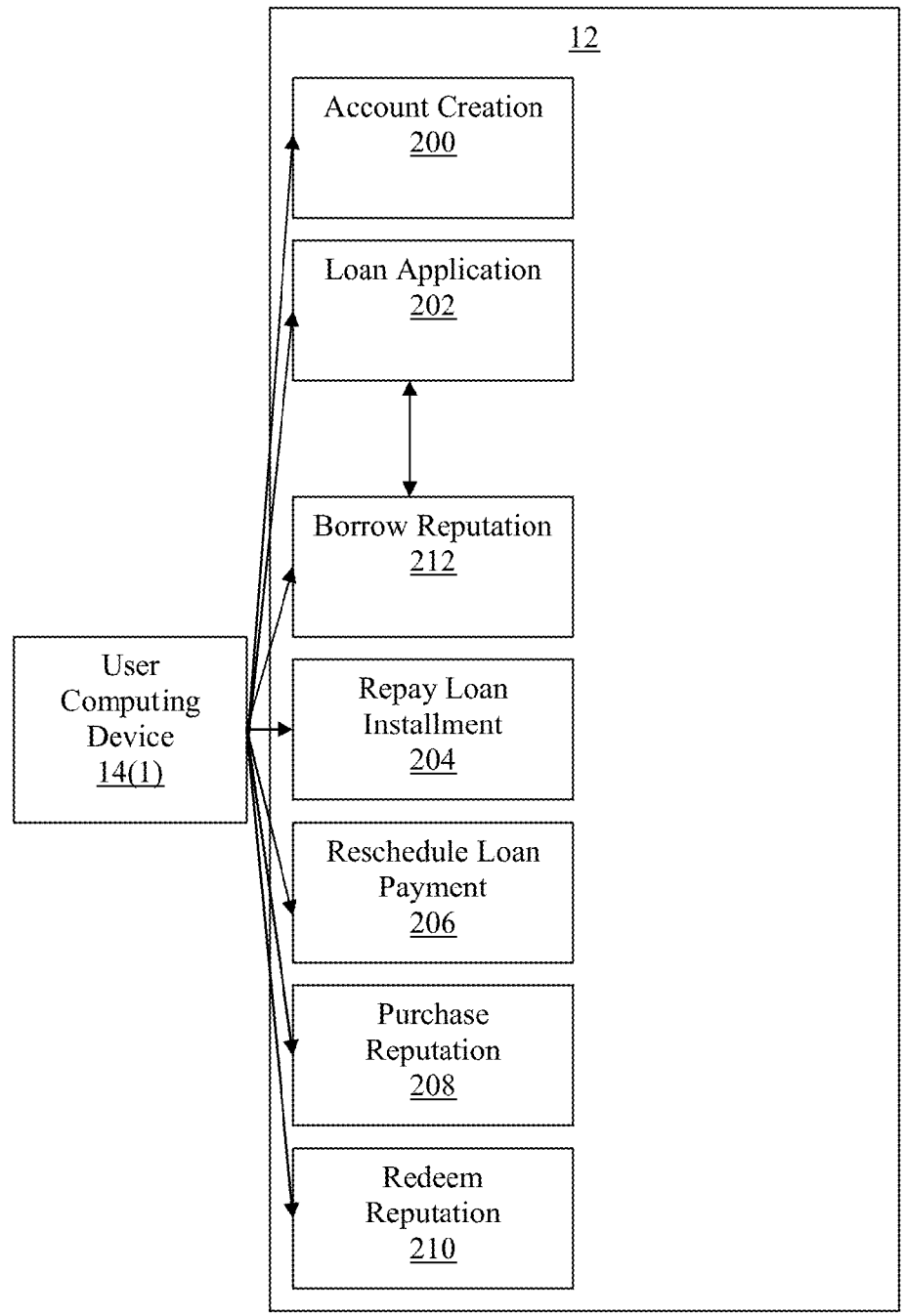
FIG. 2 illustrates a block diagram of a transaction computing apparatus in accordance with an aspect of the present disclosure.

Referring to FIG. 2, a block diagram of a transaction computing apparatus 12 is illustrated in accordance with an aspect of the present disclosure. The transaction computing apparatus 12 includes one or more computing managers for facilitating user interaction with the apparatus 12. In particular to the example aspect in FIG. 2, the apparatus 12 includes an account creation manager 200, a loan application manager 202, a repay load installment manager 204, a reschedule loan payment manager 206, a purchase reputation manager 208, a redeem reputation manager 210 and a borrow reputation manager 212.

In an aspect, a user can interact with the transaction computing apparatus 12 through an account creation manager 200 that displays information to the user, via a displayed user interface. In particular, the user can submit personal attribute information including, but not limited to, demographic information, social network memberships, associations, behavior, and associated data, Internet/online profile/presence information, personal financial information/records, assets, debt, and income, via the user interface. The personal attribute information can further be obtained by the account creation manager 200 through requests to third parties and/or external sources, such as a credit scores from a consumer or credit reporting agency. The apparatus 12 may request user consent prior to retrieving information from external sources. Some or all of a user's profile information can be included in a public user profile that is visible to other users. In some embodiments, each user's public profile includes information regarding their reputation amount and/or value and transaction history information. Upon registration, the apparatus 12 can allocate an initial amount of reputation unit(s) to the user. This may be done by associating a value of the number of allocated units of reputation associated with stored user registration and/or profile information. In an aspect, the initial allocated reputation unit(s) amount varies for each user based on the user's associated personal attribute information. In another aspect, users can register with the apparatus 12 without providing personal attribute information and/or without receiving an initial allocation of reputation.

A user can further purchase reputation unit(s) by utilizing a purchase reputation manager 208 of the apparatus 12. The purchase reputation manager 208 can facilitate a user's purchase of reputation unit(s) using cash based on an exchange rate. In some aspects, a user can purchase units of reputation at any time up to a maximum amount set by the apparatus 12. The maximum allowable amount of reputation unit(s) can be determined by the apparatus 12 for each user and can be based on the user's internal and external history as well as the total amount of reputation allocated to all users, for example. However, in an aspect, a user is not required to receive an initial allocation of reputation unit(s) or purchase reputation unit(s) in order to participate in the system in a role other than a reputation lender.

The exchange rate is determined by the apparatus 12 for each user based on personal attribute information associated with activity level, such as the number of logins to the apparatus 12, loan applications, and/or transaction in which the user has participated, outstanding loans, reputation loans, defaults and the like. The exchange rate also considers the user's historical success rate including satisfaction of personal loans and satisfaction of loans by other borrowers for which the user loaned reputation unit(s) as collateral, rate of loans to a plurality of other borrowers, amount of loans to other borrowers, and frequency of loan defaults by other borrowers. It should be noted that the above factors are exemplary only as additional/other factors may be considered by the apparatus 12. The exchange rate can fluctuate on a daily or other time period basis according to the above factors. For example, the apparatus 12 can be configured to raise a user's exchange rate based on the frequency by which and/or how often collateralized transactions are successful (e.g. loan satisfaction). In a contrasting example, the apparatus 12 can be configured to decrease a user's exchange rate if the user is idle or if the user lends reputation unit(s) to a user in a collateralized transaction that is unsuccessful (e.g. loan default).

Financial Transactions

Figure 3:
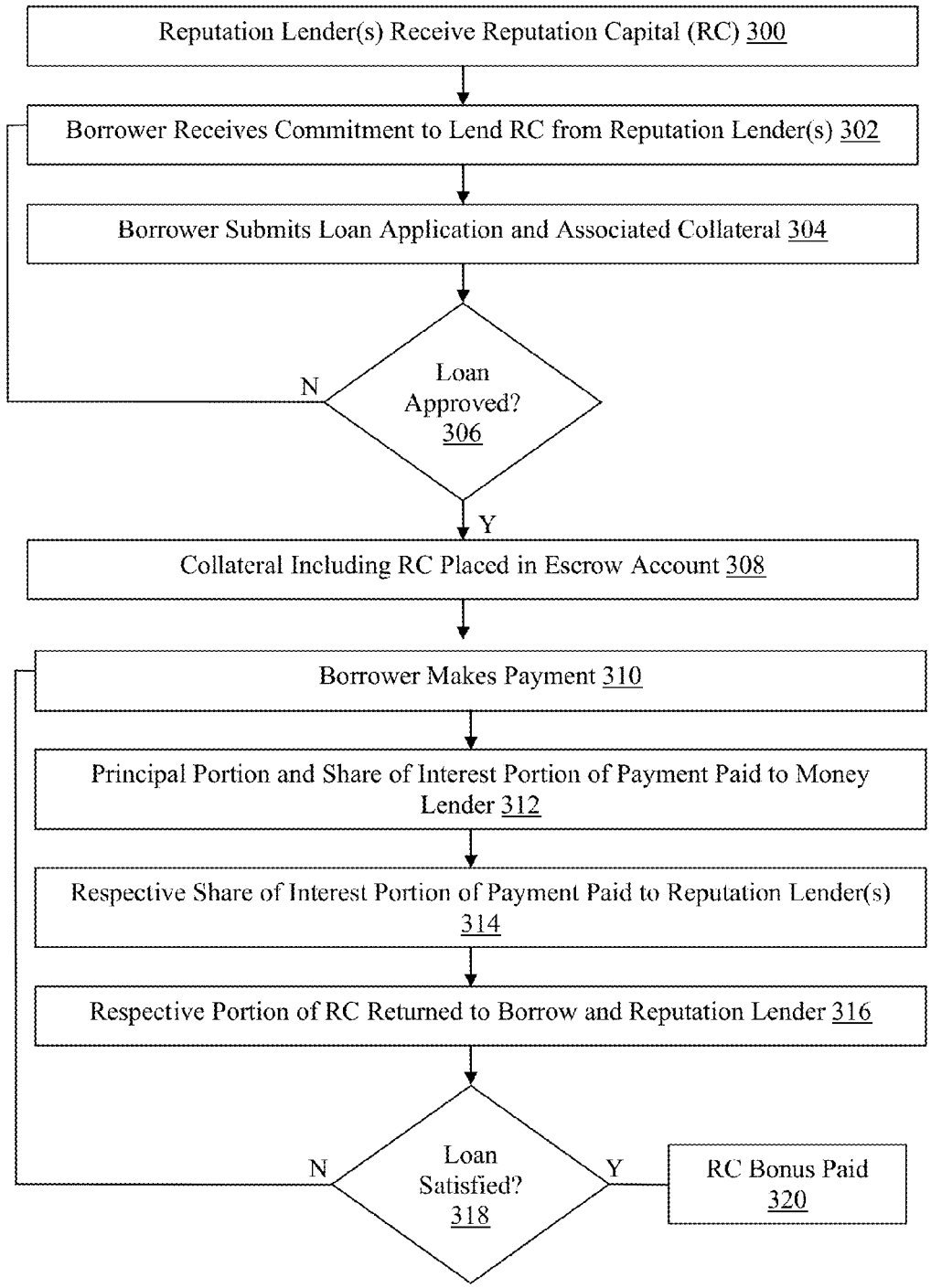
FIG. 3 illustrates a flow chart of an exemplary method for facilitating collateralized transactions in accordance with an aspect of the present disclosure.

Referring to FIGS. 2-3, an exemplary method for facilitating collateralized financial transactions is shown. In particular, FIGS. 2-3 show some exemplary operations of applying for, receiving, and disposing of a loan. At step 300, a user of a computing device 14, and acting as a reputation lender, receives units of reputation through an initial allocation performed by interaction with the account creation manager 200 or by purchasing reputation unit(s) through the purchase reputation manager 208.

Upon the borrower interacting with the loan application manager 202, the apparatus 12 communicates a loan application form to the borrower and otherwise requests information regarding a plurality of loan parameters including, but not limited to, loan duration and loan amount requested. In one or more aspects, the apparatus 12 can determine, based at least in part on the loan parameters, the amount of reputation unit(s) that would be required to secure the loan.

At step 302, a user, acting as a borrower, receives a commitment to lend reputation unit(s) from one or more reputation lenders. Accordingly, the apparatus 12 facilitates the borrower's request for reputation unit(s) to one or more reputation lenders specifically identified by the borrower, in order to adequately collateralize the loan. Although not required, it is contemplated that the reputation lender(s) will agree to lend reputation unit(s) based on information regarding the borrower's creditworthiness as assessed from personal knowledge, and/or a social relationship(s), for example. In such an aspect, the assessment and management of credit risk is thereby decentralized from a central bank or lending source to one or more reputation lenders.

In an aspect, the borrow reputation manager 212 of the apparatus 12 can facilitate a borrower's request for a loan of reputation unit(s) as well as the borrower's selection of at least one reputation lender from a plurality of available reputation lenders. In an aspect, the borrower can submit, using the borrow reputation manager 212, a request for a specified number of reputation unit(s), as well as the other terms of the loan being applied for. The apparatus 12 can facilitate potential reputation lenders' submission of proposals, or bids, to the borrower based on an auction format, for example. Such proposals may indicate an interest rate requested for the loan of reputation unit(s). The borrower can then select one or more reputation lenders based on such proposals and/or the reputation lender can be automatically selected by the apparatus for the borrower based on the lowest interest rate(s) offered by one or more reputation lenders.

Because each reputation lender user has a personalized exchange rate, the borrower may borrow reputation unit(s) from a relatively expensive or relatively inexpensive reputation lender and the number of units of reputation required to satisfy a borrower's request may vary. However, in some embodiments, the equivalent cash amount is used by the apparatus 12 to determine any interest payments to the reputation lender(s) and, therefore, the relative expense of the reputation lender(s) does not affect any cash interest payments.

Based on the borrower's selection of, and/or automatic pairing with, an available reputation lender, and/or commitment of an identified reputation lender, the borrower can submit the loan application information including associated reputation collateral to the apparatus 12 at step 304 using the loan application manager 202.

At step 306, the apparatus 12 determines a loan commitment decision based at least on the requested loan terms and associated collateral. In some aspects, one or more factors may be weighed by the apparatus 12 in making the loan commitment decision, and/or determining an interest rate to associate with the decision. Such factors include, but are not limited to, the identity, experience, and success rate of the reputation lender(s) associated with the collateral for the loan application. In one exemplary aspect, the borrower receives a commitment of reputation unit(s) from a more experienced and successful reputation lender thereby increasing the likelihood the apparatus 12 will approve the loan application, as well as decrease the interest rate offered.

Upon making a loan commitment decision at step 306, the apparatus 12 communicates the approval or denial decision to the borrower such as via the user interface, e-mail and/or short or multimedia messaging service. If the loan is denied, the borrower can request additional units of reputation as collateral from one or more reputation lenders at step 302 or abandon the loan application.

If the loan is approved, the loan commitment decision communicated to the borrower can include a plurality of loan terms including, but not limited to, the requested monetary amount, loan duration, and interest rate. It should be noted that the loan terms may not necessarily correspond to those loan terms requested by the borrower in the loan application. If the borrower does not agree to the loan terms, the borrower can abandon the loan application or request additional units of reputation in order to decrease risk and potentially decrease the interest rate offered. If the borrower agrees to the loan terms, the loan agreement is finalized and, at step 308, the apparatus 12 can allocate the collateral, including any units of reputation, to one or more escrow accounts.

At step 310, the borrower can interact with the repay loan installment manager 204 of the apparatus 12 to make an installment payment according to the loan terms. Upon submission of a payment, the repay loan installment manager 204 of the apparatus 12 updates the loan balance associated with the borrower's loan, such as in a database in memory 20. At step 312, the apparatus 12 distributes the principal portion of the loan payment, along with at least a share of the interest portion of the payment, to an account of the money lender At step 314, the apparatus 12 distributes any respective share of the interest portion of the payment to the cash account of each money lender. The apparatus 12 further distributes any respective share of the interest portion of the payment to each reputation lender. In one aspect, the respective share of the interest portion of the payment is determined by the proportional share of contributed reputation unit(s) based on the exchange rate in effect on the day the reputation unit(s) were committed to the borrower. Other interest distribution calculations are also possible including, but not limited to, calculations based on the exchange rate in effect at the time the borrower accept the terms of the loan and at the time of each of the borrower's payments.

At step 316, the apparatus is configured to distribute a fraction of the reputation amount from the escrow account to the borrower and/or the reputation lender(s) according to each respective contribution to the collateral of the loan. Accordingly, upon each installment payment, units of reputation are returned to those who contributed reputation unit(s) to collateralize the loan. In some aspects, the distribution of reputation unit(s) is based on the total amount of reputation contributed by all reputation lenders divided by the number of payments required to satisfy the loan, though other agreed-upon arrangements and/or predefined distributions are possible.

At step 318, the apparatus 12 determines, based on the loan balance, whether the loan has been satisfied. If the loan has been satisfied, in some embodiments, bonus units of reputation are distributed at step 320 to the borrower and/or each reputation lender that loaned reputation unit(s) used as collateral for the successful loan. The apparatus 12 can further be configured to modify the exchange rate of the borrower and/or reputation lender to reflect the successful transaction.

If a borrower anticipates missing a loan installment payment and/or has already missed a payment, the borrower can interact with the reschedule loan payment manager 206 to make alternative payment arrangements. Such arrangement can include finance and/or reputation unit(s) charges based on a plurality of factors including the borrower's default rate and the number of payments missed, for example.

If a borrower repeatedly fails to pay scheduled loan installments, and fails to make satisfactory alternative arrangements, the apparatus 12 can determine that the borrow is in a default status with respect to the loan and all remaining reputation unit(s) v in the associated escrow account can be forfeited by those reputation lenders that provided reputation as collateral for the unsuccessful loan. Accordingly, reputation lenders are incentivized to support the borrower in avoiding default. In the event of a default, the apparatus 12 can record the default in a database in memory 20 as associated with the borrower, render the fault event visible on the borrower's public profile, and/or modify the borrower's exchange rate to reflect the default.

At any time provided by the apparatus 12, such as upon exit of the system and removal of a user's profile and personal information, a user can interact with the redeem reputation manager 210 to exchange units of reputation for cash at an exchange rate provided by the apparatus 12, such as the user's current exchange rate at the time of the exchange.

Referring to FIG. 4, an exemplary amortization table is shown for a loan serviced by the apparatus 12. In the exemplary operation, the borrower has submitted a loan application with associated collateral including reputation unit(s) loaned by one reputation lender. The borrower has approved the terms included with the loan commitment decision communicated by the apparatus and has borrowed $2000.00 for 12 months at 10% interest to the money lender and 5% interest to the reputation lender. The borrower had 1000 units of reputation and therefore required and received from the reputation lender 1000 units of reputation based on a one dollar to unit of exchange rate for both parties to the transaction. Accordingly, in the first month, the borrower interacted with the repay loan installment manager 204 to pay, or arrange automatic payments from the borrower's cash account or an external source, $180.52, $155.52 of which is the principal portion of the payment and is transferred by the apparatus 12 to the money lender's cash account along with the $16.67 share of the $25.00 interest portion of the payment owed the money lender. The apparatus 12 further distributes the $8.33 share of the $25.00 interest portion of the payment owed the reputation lender leaving a loan balance of $1844.48 after the first payment.

Assuming the borrower continued to make timely payments, in the twelfth month, the principal portion of the $180.52 payment is $178.29 which is distributed to the money lender along with the $2.23 share of the interest portion of the payment. The $0.74 share of the interest portion of the payment is distributed by the apparatus 12 to the reputation lender. As the balance is satisfied, a bonus reputation distribution is made by the apparatus 12 to the reputation lender, which is, in this exemplar operation, equal to the total interest paid on the loan or $166.20.

Bank Guarantee

In an aspect, the apparatus 12 can additionally be configured to issue a bank guarantee to a borrower. In this embodiment, reputation associated with the bank guarantee application/request is forfeited if the user, operator, and/or administrator of the apparatus 12, or the issuer of the bank guarantee, is called upon to pay the guaranteed liability on behalf of the borrower. If the bank guarantee is successful, and the borrower meets all required obligations, reputation is released from the escrow account and reputation bonuses are optionally awarded.

Service Transaction

In an aspect, the apparatus 12 can be configured to facilitate collateralization of a services transaction in which a receiver engages a service provider. The receiver may not have the ability to pay cash for the service and/or may not be able to otherwise provide sufficient means of providing a deposit or other collateral. Accordingly, the apparatus 12 facilitates, through the borrower reputation manager 212, the receiver's borrowing units of reputation from one or more lenders to satisfy and/or improve the terms of the service transaction. Alternatively, the borrower may be the service provider, as required by the receiver of the service, in order to improve the terms of the transaction and satisfy what might be reluctance by the receiver to engage a service provide of unknown trustworthiness or quality.

Rental Transaction

In an aspect, the apparatus 12 can be configured to facilitate collateralization of a rental transaction in which a provider requires collateral for the renting of a good and/or service. In the event the borrower does not have sufficient collateral to satisfy the terms of the rental transaction, the apparatus 12 facilitates, through the loan application manager 202 and borrower reputation manager 212, the receiver's borrowing units of reputation from one or more lenders to thereby satisfy or improve the terms of the rental transaction.

Exchange of Value or Services

In an aspect, the apparatus 12 can be configured to facilitate collateralization of a transaction for an exchange of value such as a barter transaction, an exchange of services, an exchange of goods, products, financial instruments, or any other type of value denomination. For instance, if the parties to such a transaction do not know each other well, believe there is some risk such as failure to complete the transaction, believe that there is a misrepresentation of the good or service, believe that the good or service are of poor quality, and/or believe that there is a risk of default, the apparatus 12 can be configured to require either party, and/or facilitate either party's imposed requirement, to collateralize the transaction with a specified number of reputation units. While each party can collateralize the transaction with only their own reputation unit(s), the number of reputation unit(s) required will be much higher than if the units of reputation were provided by a plurality of reputation lenders vouching for each party by putting their own units of reputation at risk.

Once the required number of reputation unit(s) is committed to the transaction, the unit(s) of reputation are placed in escrow by the apparatus 12. After the transaction is completed, or within a specified time period, the apparatus 12 is configured to communicate confirmation of the completion of the transaction to the buyer, as well as an assessment of the authenticity of the seller and/or the transaction, the accuracy of the seller's representation(s), and the quality of the good(s) or service(s).

Based on the buyer's submissions, the seller's exchange rate can be modified and/or the buyer's comments and/or ratings can be rendered visible on the seller's public profile. For each positive confirmation, the seller, buyer, and/or reputation lenders that provided reputation as collateral for the transaction can be rewarded in the form of bonus reputation. For each negative confirmation, the units of reputation loaned as collateral can be forfeited, the exchange rate of the parties can be modified to reflect the unsuccessful transaction, and/or the unsuccessful transaction can be rendered visible by the apparatus 12 on the parties' public profiles.

Informal Exchange

In addition to transactions involving an exchange of value, the apparatus 12 can be configured to facilitate transactions that do not involve value such as in alternative economies, freeconomies, and/or barter or direct value exchange networks. In an aspect, the reputation unit(s) cannot be purchased with cash based on an exchange rate. The transaction among parties, using the apparatus 12, can create a payoff to a lender in the form of units of reputation, creditworthiness through incentives and penalties including forfeiture and awarding of reputation, and manage the risk of default through the introduction of third party reputation lenders to a transaction. Accordingly, units of reputation can be used as a form of currency or value in such an informal exchange system.

Non-Consumer Transactions and Financial Instruments

In an aspect, users of the apparatus 12 are not individuals but rather are corporations, organizations, and/or public entities. These entities engage in transactions such as bonds, debt, official instruments, trade agreements, and other financial instruments which often require the creation of trust, collateralization, reputation assessment, and risk assessment, management, and mitigation. As in the financial transaction and informal exchange contexts, the apparatus 12 provides a social guarantor structure in which reputation lenders can vouch for transactions by putting up collateral, in the form of units of reputation, which is used to mitigate the risk of a transaction. Accordingly, reputation lenders assume at least a portion of the risk of such transactions, thereby suggesting they may have private information that makes them confident in successful outcomes, in exchange for a premium including reputation and/or additional cash payments or services.

It is further contemplated that in any of the above-identified contexts, ratings entities could act as reputation lenders and provide units of reputation as collateral to transaction resulting in rewarding of additional reputation and interest payments, for example, or forfeiture of units of reputation held in escrow, for example. Accordingly, individuals, corporations, organizations, and/or public entities, for example, could effectively pay ratings entities for assuming their risks. However, such ratings agencies would not simply be assessing credit risk of other system users but would also be assuming risk by risking their own units of reputation, exchange rate and/or value of their units of reputation. Accordingly, ratings entities would be strongly incentivized to only assume risks that are tolerable and associated with transactions likely to be successful.

Authentication

In an aspect, the apparatus 12 can additionally be configured to facilitate an authentication transaction such as of a party's identity or some other attribute, to another party, organization, or system. Accordingly, a user of the borrow reputation manager 212 can receive a commitment from one or more reputation lenders for a number of reputation unit(s) necessary to satisfy the terms of a transaction involving a risk of false authentication. Thereby, the reputation lender(s) vouch for the authenticity of the user by risking their own units of reputation on the accuracy of the authentication of the user and/or outcome of the transaction.

Accordingly, as illustrated and described with the examples herein, this technology provides a social method of collateralization which distributes risk and incentivizes assumption of risk by knowledgeable parties. The technology creates a reputation asset class, each unit of which has a rate of exchange to currency, as determined for each user based on a plurality of factors, and modified based on associated transaction outcomes. The technology further provides methods of quantifying trust, reputation, and creditworthiness based on a non-predictive methodology thereby improving assessment, management, mitigation, and distribution of risk in collateralized transactions.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method of facilitating collateralized transactions, comprising:
    allocating, at a transaction computing apparatus, one or more units of reputation to one or more reputation lenders as a result of at least one of an initial allocation of the one or more units of reputation or a purchase of the one or more units of reputation based on an exchange rate, the one or more units of reputation corresponding to a cash value of an exchange rate determined for each of the one or more reputation lenders based on one or more personal attributes of the one or more reputation lenders, the personal attributes comprising one or more of a credit score, information regarding financial transaction history, demographic information, financial records, an activity level, a historical success rate, a rate or number of loans to one or more other borrowers, or a rate of loan defaults by one or more other borrowers;
    obtaining, at the transaction computing apparatus, a transaction request for a transaction including one or more transaction parameters, the transaction requiring a set number of units of reputation to secure the transaction;
    associating, with the transaction computing apparatus, the set number of units of reputation from the one or more units of reputation allocated to at least one of the one or more reputation lenders to the transaction request as collateral;
    distributing, with the transaction computing apparatus, the set number of units of reputation based at least in part on the outcome of the transaction to at least the at least one of the one or more reputation lenders; and
    modifying, with the transaction computing apparatus, the exchange rate for each of the at least one of the one or more reputation lenders that provided one or more units of reputation as collateral based on the outcome of the transaction.

2. The method as set forth in claim 1 wherein the transaction request is a loan request and wherein the one or more transaction parameters is selected from a loan duration and a loan amount, the method further comprising:
    generating, at the transaction computing apparatus, a loan commitment decision based on the transaction parameters and associated collateral; and
    communicating, via a user interface provided by the transaction computing apparatus, the loan commitment decision to at least the borrower.

3. The method as set forth in claim 2 wherein the loan commitment decision is an approval of the loan request, wherein the loan commitment decision includes a plurality of loan terms including at least an amount, a duration, and an interest rate, the method further comprising:
    obtaining, at the transaction computing apparatus, the borrower's approval of the plurality of loan terms after communicating with the transaction computing apparatus the loan commitment decision to at least the borrower;
    allocating with the transaction computing apparatus at least the collateral to an escrow account; and
    wherein the distributing step further comprises distributing units of reputation to each reputation lender for each borrower payment received by the transaction computing apparatus and distributing bonus units of reputation to the borrower and each reputation lender if the loan terms are satisfied.

4. The method as set forth in claim 1 wherein the step of associating collateral further comprises:
    facilitating, with the transaction computing apparatus, a reputation loan request from a borrower to at least one identified reputation lender; and
    facilitating, with the transaction computing apparatus, a reputation loan request from a borrower to a plurality of unidentified reputation lenders and facilitating borrower selection of at least one reputation lender from the plurality of reputation lenders.

5. The method of claim 1 wherein the transaction request is selected from at least one of a financial transaction request, a bank guarantee request, a service transaction request, a rental transaction request, an exchange of value request, and informal exchange request, a non-consumer transaction request, a financial instrument request, and an authentication request.

6. A non-transitory computer readable medium having stored thereon instructions for facilitating collateralized transactions comprising machine executable code which when executed by at least one processor, causes the processor to perform steps comprising:
    allocating one or more units of reputation to one or more reputation lenders as a result of at least one of an initial allocation of the one or more units of reputation or a purchase of the one or more units of reputation based on an exchange rate, the one or more units of reputation corresponding to a cash value of an exchange rate determined for each of the one or more reputation lenders based on one or more personal attributes of the one or more reputation lenders, the personal attributes comprising one or more of a credit score, information regarding financial transaction history, demographic information, financial records, an activity level, a historical success rate, a rate or number of loans to one or more other borrowers, or a rate of loan defaults by one or more other borrowers;
    obtaining a transaction request for a transaction including one or more transaction parameters, the transaction requiring a set number of units of reputation to secure the transaction;
    associating the set number of units of reputation from the one or more units of reputation allocated to at least one of the one or more reputation lenders to the transaction request as collateral;
    distributing the set number of units of reputation based at least in part on the outcome of the transaction to at least the at least one of the one or more reputation lenders; and
    modifying the exchange rate for each of the at least one of the one or more reputation lenders that provided one or more units of reputation as collateral based on the outcome of the transaction.

7. The medium as set forth in claim 6 wherein the transaction request is a loan request and wherein the one or more transaction parameters is selected from at least one of loan duration and loan amount and further having stored thereon instructions that when executed by the processor causes the process to perform steps comprising:

generating, at the transaction computing apparatus, a loan commitment decision based on the transaction parameters and associated collateral; and communicating, via a user interface provided by the transaction computing apparatus, the loan commitment decision to at least the borrower.

8. The medium as set forth in claim 6 wherein the loan commitment decision is an approval of the loan request and wherein the loan commitment decision includes a plurality of loan terms including at least an amount, a duration, and an interest rate and further having stored thereon instructions that when executed by the processor causes the process to perform steps comprising:

obtaining, at the transaction computing apparatus, the borrower's approval of the plurality of loan terms after communicating with the transaction computing apparatus the loan commitment decision to at least the borrower;

allocating with the transaction computing apparatus at least the collateral to an escrow account; and wherein the distributing step further comprises distributing units of reputation to each reputation lender for each borrower payment received by the transaction computing apparatus and distributing bonus units of reputation to the borrower and each reputation lender if the loan terms are satisfied.

9. The medium as set forth in claim 6 further having stored thereon instructions that when executed by the processor causes the process to perform steps comprising:

facilitating, with the transaction computing apparatus, a reputation loan request from a borrower to at least one identified reputation lender; and facilitating, with the transaction computing apparatus, a reputation loan request from a borrower to a plurality of unidentified reputation lenders and facilitating borrower selection of at least one reputation lender from the plurality of reputation lenders.

10. The medium as set forth in claim 6 wherein the transaction request is selected from at least one of a financial transaction request, a bank guarantee request, a service transaction request, a rental transaction request, an exchange of value request, and informal exchange request, a non-consumer transaction request, a financial instrument request, and an authentication request.

11. A transaction computing apparatus comprising:

one or more processors;

a memory coupled to the one or more processors, the one or more processors configured to execute programmed instructions stored in the memory comprising:

allocating one or more units of reputation to one or more reputation lenders as a result of at least one of an initial allocation of the one or more units of reputation or a purchase of the one or more units of reputation based on an exchange rate, the one or more units of reputation corresponding to a cash value of an exchange rate determined for each of the one or more reputation lenders based on one or more personal attributes of the one or more reputation lenders, the personal attributes comprising one or more of a credit score, information regarding financial transaction history, demographic information, financial records, an activity level, a historical success rate, a rate or number of loans to one or more other borrowers, or a rate of loan defaults by one or more other borrowers;

obtaining a transaction request for a transaction including one or more transaction parameters, the transaction requiring a set number of units of reputation to secure the transaction;

associating the set number of units of reputation from the one or more units of reputation allocated to at least one of the one or more reputation lenders to the transaction request as collateral;

distributing the set number of units of reputation based at least in part on the outcome of the transaction to at least the at least one of the one or more reputation lenders; and modifying the exchange rate for each of the at least one of the one or more reputation lenders that provided one or more units of reputation as collateral based on the outcome of the transaction.

12. The apparatus as set forth in claim 11 wherein the transaction request is a loan request and wherein the one or more transaction parameters is selected from at least one of loan duration and loan amount, and wherein the one or more processors is further configured to execute programmed instructions stored in the memory further comprising:

generating, at the transaction computing apparatus, a loan commitment decision based on the transaction parameters and associated collateral; and communicating, via a user interface provided by the transaction computing apparatus, the loan commitment decision to at least the borrower.

13. The apparatus as set forth in claim 11 wherein the loan commitment decision is an approval of the loan request and wherein the loan commitment decision includes a plurality of loan terms including at least an amount, a duration, and an interest rate and wherein the one or more processors is further configured to execute programmed instructions stored in the memory further comprising:

obtaining, at the transaction computing apparatus, the borrower's approval of the plurality of loan terms after communicating with the transaction computing apparatus the loan commitment decision to at least the borrower;

allocating with the transaction computing apparatus at least the collateral to an escrow account; and wherein the distributing step further comprises distributing units of reputation to each reputation lender for each borrower payment received by the transaction computing apparatus and distributing bonus units of reputation to the borrower and each reputation lender if the loan terms are satisfied.

14. The apparatus as set forth in claim 11 wherein the one or more processors is further configured to execute programmed instructions stored in the memory further comprising:

facilitating, with the transaction computing apparatus, a reputation loan request from a borrower to at least one identified reputation lender; and facilitating, with the transaction computing apparatus, a reputation loan request from a borrower to a plurality of unidentified reputation lenders and facilitating borrower selection of at least one reputation lender from the plurality of reputation lenders.

15. The apparatus as set forth in claim 11 wherein the transaction request is selected from at least one of a financial transaction request, a bank guarantee request, a service transaction request, a rental transaction request, an exchange of value request, and informal exchange request, a non-consumer transaction request, a financial instrument request, and an authentication request.

* * * * *